(12) United States Patent
Napierski et al.

(10) Patent No.: US 10,294,653 B2
(45) Date of Patent: May 21, 2019

(54) RAIN OVERFLOW BASIN FOR COLLECTING AND STORING WATER

(71) Applicant: Amiantit Germany GmbH, Döbeln (DE)

(72) Inventors: Uwe Napierski, Nittendorf (DE); Heinz Jürgen Staratzke, Hamburg (DE); Manuela Wendt, Neubrandenburg (DE)

(73) Assignee: Amiantit Germany GmbH, Dobeln (DE)

(*) Notice: Subject to any disclaimer, the term of this patent is extended or adjusted under 35 U.S.C. 154(b) by 0 days.

(21) Appl. No.: 15/726,062

(22) Filed: Oct. 5, 2017

(65) Prior Publication Data

US 2018/0106029 A1    Apr. 19, 2018

(30) Foreign Application Priority Data

Oct. 13, 2016  (EP) .................................. 16193741

(51) Int. Cl.
 *E03F 5/10* (2006.01)
 *E03F 5/14* (2006.01)
 *E03F 5/12* (2006.01)

(52) U.S. Cl.
 CPC .............. *E03F 5/105* (2013.01); *E03F 5/101* (2013.01); *E03F 5/125* (2013.01); *E03F 5/14* (2013.01); *Y02A 10/36* (2018.01)

(58) Field of Classification Search
 CPC ..... E03F 1/00; E03F 5/10; E03F 5/101; E03F 5/105; E03F 5/12; E03F 5/125; E03F 5/14
 USPC .... 210/170.03, 747.2, 747.3; 405/36, 37, 52
 See application file for complete search history.

(56) References Cited

U.S. PATENT DOCUMENTS

| | | | | |
|---|---|---|---|---|
| 5,161,911 A * | 11/1992 | Regan | ..................... | E03F 5/101 405/36 |
| 5,902,477 A * | 5/1999 | Vena | ......................... | E03F 5/12 210/162 |
| 6,086,756 A * | 7/2000 | Roy | ......................... | E03F 5/14 210/170.03 |
| 6,991,734 B1 * | 1/2006 | Smith | ..................... | E03F 5/125 210/170.03 |

(Continued)

FOREIGN PATENT DOCUMENTS

| | | |
|---|---|---|
| DE | 89 15 629 U1 | 1/1991 |
| DE | 102 05 722 A1 | 8/2003 |

(Continued)

*Primary Examiner* — Christopher Upton
(74) *Attorney, Agent, or Firm* — Merchant & Gould P.C.

(57) ABSTRACT

A rain overflow basin for collecting and storing rainwater, mixed water, or wastewater, has an inflow, an outflow, a basin chamber, a basin spillway, which is equipped with a weir threshold and is connected downstream of the basin chamber. A drain discharges the basin spillway, and a purification device purifies water flowing from the basin chamber to the basin spillway. A retention wall between the basin chamber and the basin spillway dams up water accumulating in the basin chamber. Water draining from the basin chamber is dammed up in a storage space is between the retention wall and the weir threshold, to reach the basin spillway via the weir threshold. The retention wall includes a passage opening. A purification device extends into the basin chamber such that water draining from the basin chamber through the passage opening into the storage space flows through the retention element.

13 Claims, 10 Drawing Sheets

(56) References Cited

U.S. PATENT DOCUMENTS

| | | | | |
|---|---|---|---|---|
| 7,022,243 | B2 * | 4/2006 | Bryant | E03F 5/12 |
| | | | | 210/170.03 |
| 7,374,364 | B2 * | 5/2008 | Allard | E03F 5/0404 |
| | | | | 210/170.03 |
| 8,062,531 | B1 * | 11/2011 | LoBello | E03F 1/005 |
| | | | | 210/170.03 |
| 8,343,340 | B2 * | 1/2013 | Oda | E03F 5/12 |
| | | | | 210/170.03 |
| 8,894,866 | B1 * | 11/2014 | Belasco | E03F 5/10 |
| | | | | 210/747.2 |
| 2006/0273046 | A1 | 12/2006 | Ghalib | |

FOREIGN PATENT DOCUMENTS

| | | |
|---|---|---|
| DE | 10 2005 019 001 A1 | 10/2006 |
| EP | 2 508 686 A1 | 10/2012 |

* cited by examiner

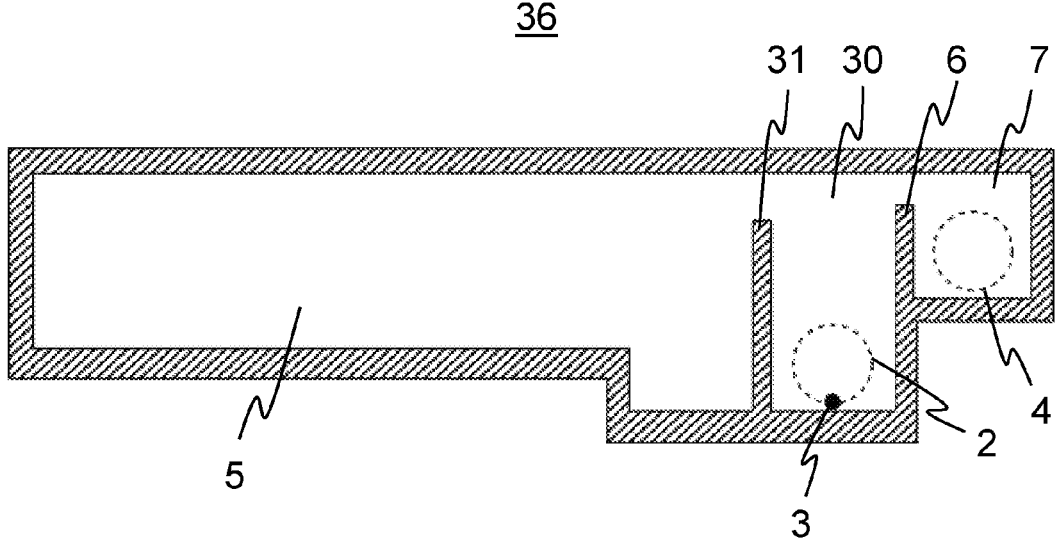
(Prior Art) Fig. 1
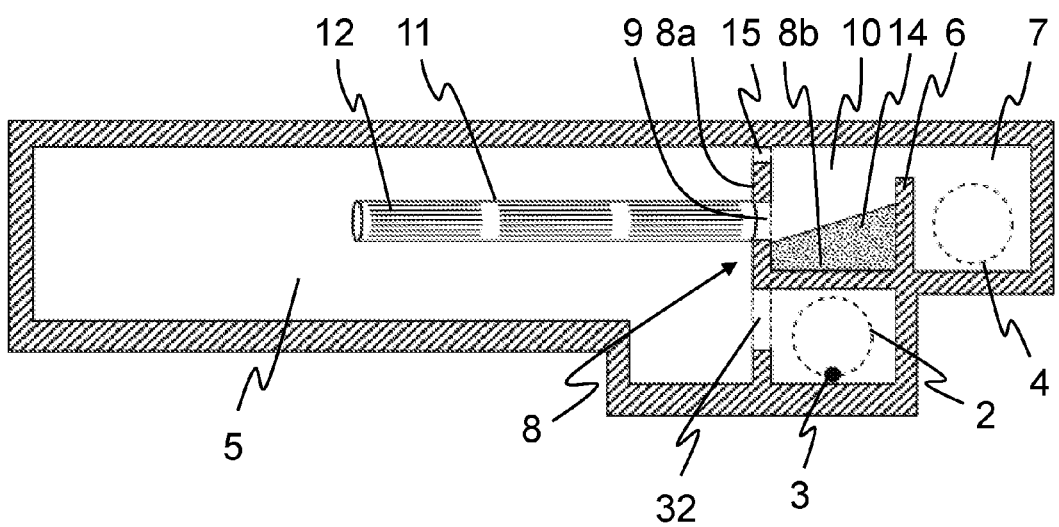
Fig. 2

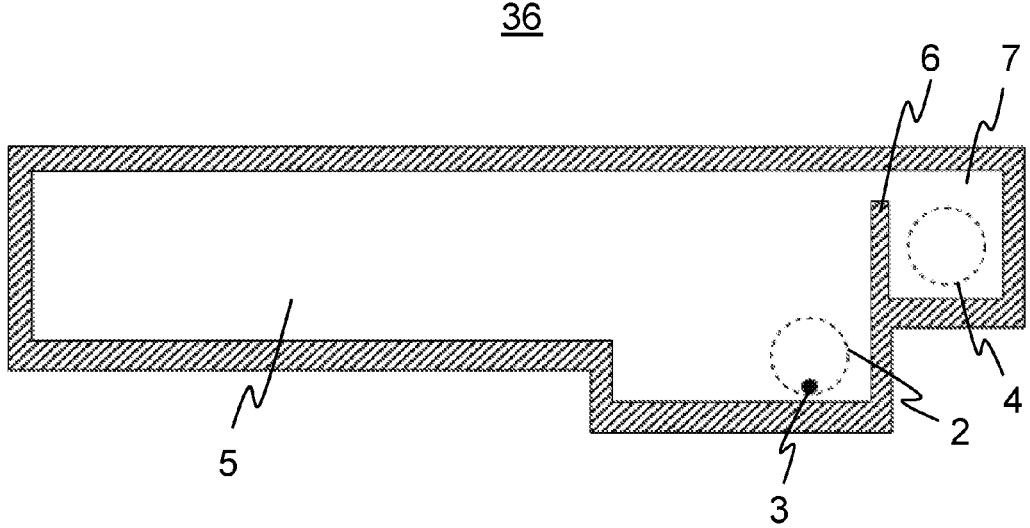
(Prior Art)　　　　　　　　　　　　Fig. 4
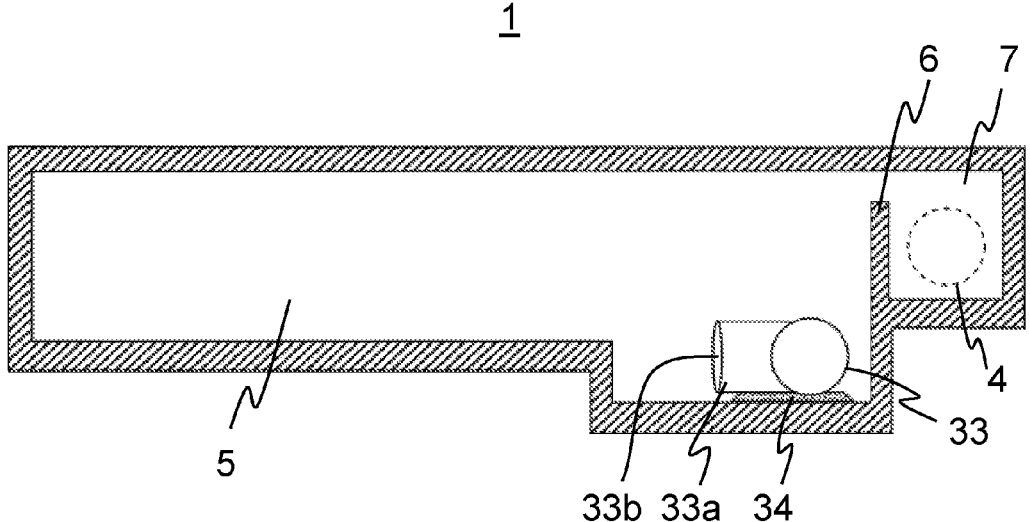
Fig. 5a

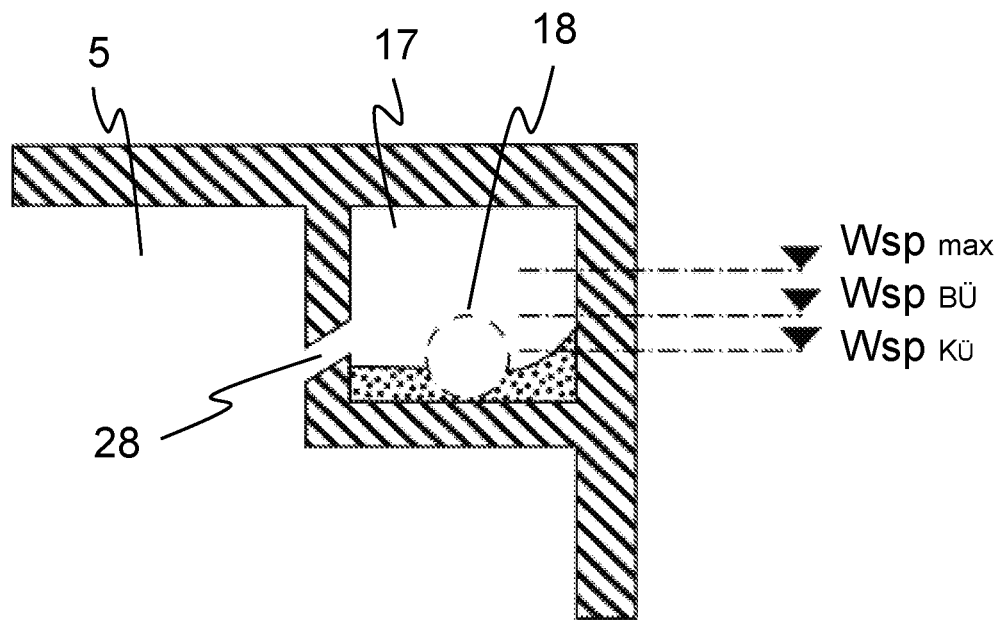
(Prior Art)  Fig. 9a
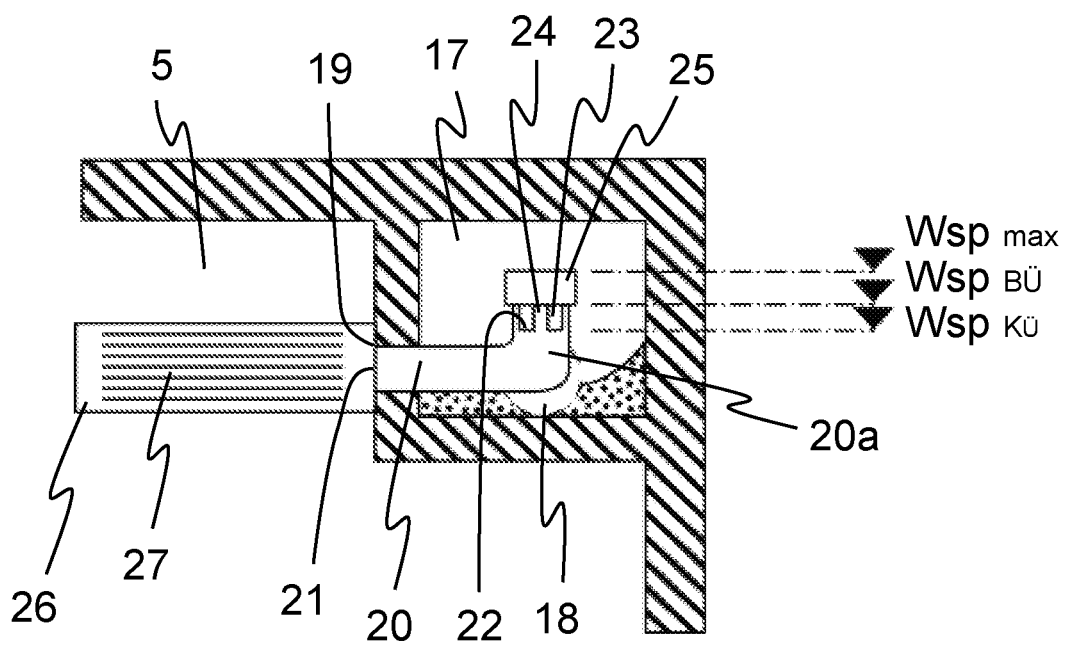
Fig. 9b

RAIN OVERFLOW BASIN FOR COLLECTING AND STORING WATER

This application claims benefit of Ser. No. 16193741.2, filed 13 Oct. 2017 in Europen and which application is incorporated herein by reference. To the extent appropriate, a claim of priority is made to the above disclosed application.

The present invention relates to a rain overflow basin for collecting and storing water and a method for the renovation of a rain overflow basin.

TECHNOLOGICAL BACKGROUND

Rain overflow basins are used in so-called mixed systems for drainage technology, for example, to achieve a buffer effect in the event of suddenly occurring precipitation events such as heavy rain. A drainage of large areas, for example, in the catchment area of cities or on freeways can thus occur. In mixed systems, in particular dirty water, external water, and rainwater is drained in mixed form (as so-called mixed water) in a common line.

Rain overflow basins of the type in question can be embodied as catch basins, pass-through basins, or composite basins. Catch basins have the task of storing the first discharge (flushing surge) and supplying it in a throttled manner to the sewer system or a wastewater treatment facility. Pass-through basins have the task of storing mixed water, supplying it in a throttled manner to the sewer system or a wastewater treatment facility, and subjecting it to mechanical purification before the discharge via a clear water spillway, for example, by way of sedimentation or coarse material retention. Composite basins are a combination of catch basins and pass-through basins.

A rain overflow basin of the type in question generally has an inflow and outflow, each for connection to a sewer system, and a basin chamber, which is, for example, a storage chamber or a sedimentation chamber depending on the embodiment and function. The flow direction of the water generally occurs from the inflow to the outflow. A throttle structure having a throttle element, which is used for throttling the water flow, is often connected downstream of the outflow.

In general, rain overflow structures have a basin spillway, which is arranged before the basin chamber and starts after the filling of the basin chamber. The water of the basin spillway is discharged, for example, via an outlet or a channel (discharge channel), for example, into an outlet structure, a receiving water (for example, a body of water), or the like. The basin spillway is generally designed as a fixed threshold (spreading weir) having lateral incident flow, for example, having a spillway on one or both sides. Furthermore, an additional clear water spillway can be connected to the basin chamber, via which the mechanically clarified water can be discharged either in a throttled or unthrottled manner.

The rain overflow basin can be arranged in relation to the sewer system in the main connection, in the secondary connection, or in the false secondary connection. In the main connection, basin chamber and sewer system are hydraulically coupled both during the filling and also during the emptying, i.e., the basin chamber and the sewer system fill and empty simultaneously. In the secondary connection, basin chamber and sewer system are hydraulically decoupled by a partition structure, i.e., the basin chamber fills and empties later than the sewer system. In the false secondary connection, no unambiguous assignment to the main connection or secondary connection is possible, since sometimes a main connection and sometimes a secondary connection is provided during the filling and emptying.

In the event of mixed water introductions, in general the introduction of coarse materials or other unsightly material has to be restricted to an acceptable amount (cf., for example, DIN EN 752). For this purpose, rain overflow basins are to be equipped with rake or screen systems, which can be mechanically cleaned or are automatically cleaned by cleaning devices. In this case, rakes and fine screens having slot and hole widths of 4-8 mm have proven themselves. They are generally attached at or on the threshold, via which, for example, discharge takes place to the discharge channel, body of water, or the like. After a strong discharge procedure, in general the complete clogging of rakes and screens which are not cleaned by machine is to be expected, i.e., manual cleaning of the screens and rakes is necessary. Furthermore, the rakes and screens can be operated so that in the through-flow region, a filter layer builds up from the accumulating floating and suspended materials, which acts as an additional filter.

The retrofitting of existing rain overflow basins with such screens and rakes is often problematic since, for example, the nonreturn height can change or the installation of the purification device can be hampered or cannot be performed at all because of the dimensions of the weir threshold to the basin spillway.

CLOSEST PRIOR ART

DE 10 2005 019 001 A1 describes a screen device for the coarse purification of water at the overflow of a collecting basin. The screen device is embodied as a screen drum, which is rotatably mounted on a baffle and is located in the region of an overflow edge or discharge threshold of the collecting basin. The rotational axis of the screen drum extends in parallel to the discharge threshold of the collecting basin. The water flows through the screen drum in this case, whereby pollutants located in the water remain on the surface of the screen drum. The surface of the screen drum can be cleaned by the rotation of the screen drum against a stripping device attached to the discharge threshold, for example, a brush, a comb, or the like. The rotational drive of the screen drum is performed by means of external energy, for example, by a motorized rotational drive. The screen device has a complicated structure, which is susceptible to malfunctions, in particular because of the rotational capability, the motorized drive, and the complicated design of the construction, for example, the arrangement of the baffle. The length of the screen drum and/or the surface of the screen drum through which water flows are restricted in this case, because of the parallel arrangement of the discharge threshold, by the length of the discharge threshold, i.e., the length of the discharge threshold has an effect on the purification effect. Thus, in particular in the case of elongated collecting basins and short discharge thresholds, problems can result with respect to an effective purification effect. In addition, the rotation function of the screen drum causes an increased maintenance and cleaning expenditure, to ensure the rotating movement even in the case of a longer operating duration, for example, due to increased oiling or re-greasing in the rotating region. Moreover, a motorized drive causes additional costs and maintenance work. Furthermore, the stripping device has to be regularly cleaned and/or replaced. In addition, the formation of a purifying filter layer is prevented by the continuous stripping procedure.

OBJECT OF THE PRESENT INVENTION

The object of the present invention is to provide a rain overflow basin of the type in question having an improved pollutant retention, in which the purification effect is improved and the maintenance expenditure is reduced.

ACHIEVEMENT OF THE OBJECT

According to the invention, a retention wall is provided between basin chamber and basin spillway, which is used to dam up water accumulating in the basin chamber. Moreover, a passage opening is provided in the retention wall and a storage space is provided between the retention wall and the weir threshold. The water draining from the basin chamber through the passage opening is dammed up in the storage space, to subsequently reach the basin spillway via the weir threshold. Furthermore, at least one at least regionally water-permeable, preferably elongated, movement-fixed retention element is provided as a purification device, which extends into the basin chamber, so that the water draining from the basin chamber through the passage opening into the storage space flows through the retention element and is purified at this time of coarse materials. The advantage results therefrom that the length of the retention element and/or the surface area of the retention element through which water flows is not limited by the length of the retention wall and/or the weir threshold. The length of the retention wall therefore does not have an effect on the purification effect of the retention element. Because the retention element is embodied as movement-fixed, i.e., not rotatable by motor or hydraulically, the maintenance expenditure is substantially reduced, since no rotating or driving components have to be maintained. Moreover, the retrofitting of the purification device according to the invention in a rain overflow basin of the type in question is cost-effective and is implementable in a simple manner. Because of the orientation of the retention element into the basin chamber, the nonreturn height does not change in the event of retrofitting, i.e., the maximum water level remains substantially equal. It is thus generally not necessary in the case of retrofitting and/or renovation of an existing rain overflow basin to recalculate the nonreturn height and have this authorized.

A passage, for example, a recess, a perforation, or a tubular opening, is preferably provided in the retention wall, so that water can flow from the inflow through the passage into the basin chamber. This can be achieved in existing rain overflow basins by a simple renovation measure, for example, by removing a part of a threshold.

The retention wall advantageously has an upwardly extending first wall section and a second wall section, which is oriented toward the basin spillway.

The passage opening of the retention wall is preferably located on the first wall section. The retention element extends in this case from the passage opening into the basin chamber and can be attached in a practical manner in the region of the retention wall and/or on the upwardly extending first wall section.

Alternatively or additionally, an inflow element, for example, an extension pipe, extending into the basin chamber can also be provided on the passage opening. Moreover, a retention element, preferably a plurality of retention elements arranged in parallel, can open into the inflow element, which elements extend substantially perpendicularly to the inflow element into the basin chamber. The space allocation of the basin chamber can thus be additionally optimized for the installation of retention elements.

A tubular, preferably cylindrical element can advantageously be provided as a retention element. Furthermore, the tubular retention element can have, for example, a round or polygonal cross section in this case. Due to the different embodiments of the cross section, the retention element can be individually adapted to the installation situation in the respective rain overflow basin. Furthermore, the retention element can be manufactured from corrosion-resistant material. The advantage results therefrom that the retention element is extremely robust and has a long service life.

The retention element can advantageously be embodied such that water-impermeable regions are provided, which are used, for example, for stability improvement or attaching fasteners. The water-permeable regions can have, according to one preferred embodiment of the retention element, a round, polygonal, and/or slotted perforation, so that a grating, screen, and/or net structure results. The perforation is preferably in the range of 4-10 mm×4-10 mm. For example, 100% of all pollutants having a grain size of >8 mm, 50% of all pollutants having a grain size of 4 mm, and 25% of all pollutants having a grain size of 2 mm can be held back by a grating of 8 mm×8 mm. It has surprisingly been shown that with such an embodiment of the retention elements in combination with the arrangement according to the invention of the retention elements, a filter layer made of floating and suspended materials forms in the region of the retention elements, which remains water-permeable over a very long period of time in comparison to previously known filter layers. The operating duration and the cleaning function can thus be improved substantially.

A gradient is advantageously provided in the region of the storage space, which drops from the weir threshold toward the passage opening of the retention wall. Pollutants can thus be effectively avoided in the region of the storage space, by a reverse flow of the water from the storage space toward the basin chamber alto ways taking place in the event of sinking water level in the rain overflow basin. In this manner, sedimentation procedures and pollutants accompanying them are prevented in the region of the storage space. The gradient can consist of a bulk material, inlay, casting compound, or the like or can be an integral component of the storage space floor and/or the second wall section oriented toward the basin spillway.

An emergency spillway is preferably provided between basin chamber and storage space and/or basin spillway. It is thus ensured that in case of an overload of the drain by the retention elements, for example, in the event of very strong precipitation or clogged retention elements, for example, a through flow in the retention wall above the passage opening can be used to avoid damage or a backup toward the inlet. The reliability and the function of the rain overflow basin are substantially improved by such an emergency spillway. Moreover, emergency spillways can optionally also be provided on the basin chamber, the basin spillway, or in the region between inflow and basin spillway.

A sensor device can advantageously be provided to ascertain the degree of soiling of the retention elements. The cleaning intervals can thus be individually adapted to the degree of soiling, whereby time and costs can be saved. For example, one or more pressure load cell(s) and/or water level sensor(s) can be provided in the region of the basin chamber and in the region of the storage space. The pressure difference and/or water level difference can be used in this case to conclude a soiling of the retention elements, for example, by a sufficiently large measured value difference of the sensors in the basin chamber and storage space signaling a flow rate reduction in the region of the retention element or the passage opening. In the case of a renovation or a retrofitting of an existing rain overflow basin, already provided sensors can also be repurposed for such a determination of the degree of soiling.

Concurrently or subordinately, the present invention is directed to a rain overflow basin having clear water spillway, wherein the water flows from the basin chamber to the clear water spillway through an opening in the region of the wall of the clear water spillway. In this case, a retention element is provided inside the basin chamber, which extends into the basin chamber, wherein the water draining from the basin chamber through the opening into the clear water spillway flows through the retention element and is purified at the same time.

An inflow device can advantageously be provided in the region of the opening and/or the inflow from the basin chamber into the clear water spillway. The inflow device has an entry and an exit in this case, wherein the flow direction of the water extends from the entry to the exit and the inflow device has an angled section, which is oriented essentially upward. The exit is located below the water level location of the basin spillway on the angled section Multiple retention elements, preferably arranged in parallel to one another, can preferably be provided along the storage space or the retention wall, the inflow element, and/or the clear water spillway. The advantage results therefrom that the total surface area through which the water flows and therefore the purification effect can be increased, by a larger part of the basin chamber being able to be used for the installation of retention elements. The largest possible surface area, which induces the purification effect, is thus provided, so that a continuously accompanying cleaning device, for example, a stripping device, can be omitted.

The exit of the inflow device can advantageously comprise multiple openings, for example, the inflow device can be a pipe elbow having applied settling slots. The settling slots can be formed in this case by webs of the pipe elbow.

Alternatively or additionally, an inflow device used as a storage space can be provided between the basin chamber and the basin spillway. The purified water, which passes from the basin chamber through the retention elements toward the basin spillway, can thus be conducted directly into the basin spillway. This can be advantageous above all upon the accumulation of small quantities of water. An inflow pipe is preferably provided as the inflow device between the basin chamber and the basin spillway.

Concurrently or subordinately, the present invention is directed to a method for the renovation of a rain overflow basin, which comprises the following work steps:

The preparation of a passage between inflow and basin chamber by the at least partial opening of a partition device, for example, the threshold between partition structure and basin chamber, or by the introduction of a connecting device between inflow and basin chamber, for example, a branching pipe or a T-piece, which connects inflow, basin chamber, and outflow.

The establishment or preparation of a preferably closed partition device, for example, a retention wall, in the region of the basin chamber, wherein a storage space results due to the partition device, which is connected downstream of the basin chamber and upstream of the basin spillway.

The creation of at least one passage opening in the region of the partition device or the retention wall, which is used as an outlet opening for water from the basin chamber to the storage space.

The installation of at least one retention element, which extends from a passage opening into the basin chamber, or the installation of an inflow element, which extends into the basin chamber, wherein at least one, preferably a plurality of retention elements extends or extend into the basin chamber from the inflow element.

The method can advantageously comprise the work step of preparing a gradient inside the storage space. The gradient practically drops from the weir threshold toward the passage opening of the retention wall and thus prevents sedimentation-related soiling in the region of the storage space.

The method preferably comprises the work step of preparing an emergency spillway. In this case, this can preferably involve the installation of an emergency spillway between basin chamber and storage space or at another installation location known from the prior art in the region of the basin chamber, the clear water spillway, and/or the basin spillway.

Furthermore, the method can comprise the work step of preparing a clear water spillway. The clear water spillway is preferably a clear water spillway according to the invention having inflow device.

DESCRIPTION OF THE INVENTION ON THE BASIS OF EXEMPLARY EMBODIMENTS

Advantageous embodiments of the present invention will be explained in greater detail on the basis of the figures of the drawings. In the figures:

FIG. 1 shows a simplified sectional illustration of a rain overflow basin having partition structure according to the prior art;

FIG. 2 shows a simplified sectional illustration of a first embodiment of the rain overflow basin according to the invention having emergency spillway;

FIG. 4 shows a simplified sectional illustration of a rain overflow basin without partition structure according to the prior art;

FIG. 5a shows a simplified sectional illustration of the rain overflow basin from FIG. 4 after completed first renovation step

FIG. 9a shows a simplified sectional illustration of a clear water spillway according to the prior art, and FIG. 9b shows a simplified sectional illustration of a clear water spillway according to the invention.

Figure 3A:
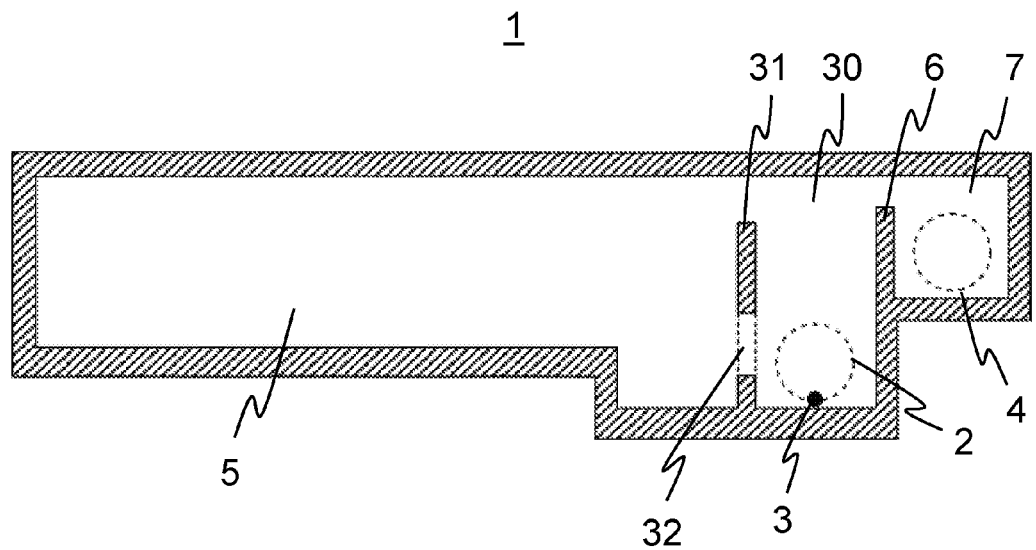
FIG. 3a shows a simplified sectional illustration of the rain overflow basin from FIG. 1 after completed first renovation step.

Reference number 36 in FIG. 1 denotes a rain overflow basin according to the prior art. The rain overflow basin 36 has an inflow 2, an outflow 3, a drain 4, and a basin chamber 5. The flow direction of the water typically occurs from the inflow 2 toward the outflow 3. The inflow 2 and the outflow 3 are arranged in this case on the partition structure 30. Furthermore, the partition structure 30 is separated via a threshold 31 from the basin chamber 5 and is separated via a weir threshold 6 from a basin spillway 7. The water is thus conducted in the partition structure 30 along the threshold 31 and the weir threshold 6 from the inflow 2 toward the outflow 3. A throttle device, for example, a throttle structure having throttle element or a throttle line (not shown in FIG. 1), can advantageously be connected downstream of the outflow 3. Furthermore, the drain 4, which is used to drain the water of the basin spillway 7, is connected downstream of the basin spillway 7.

The basin chamber 5 and the basin spillway 7 are hydraulically decoupled by the partition structure 30, i.e., the basin chamber 5 is arranged in the secondary connection. If the water level in the partition structure 30 rises above the height of the threshold 31, for example, as a consequence of a heavy rain event, the water flows from the partition structure 30 over the threshold 31 into the basin chamber 5. The basin chamber 5 is thus filled with water. If the water level rises in the course of the rain event, after the filling of the basin chamber 5, further up to the upper edge of the weir threshold 6, the water flows over the weir threshold 6 into the basin spillway 7. The water of the basin spillway 7 can be discharged via the drain 4, for example, into a downstream discharge channel, a body of water (receiving water), or the like. The water can be pumped back out of the basin chamber 5 via a pump (not shown in the figures of the drawing) and supplied to the sewer system.

After each completed rain event, pollutants can accumulate in the region of the partition structure 30, the basin chamber 5, and/or the basin spillway 7. To achieve soiling of the basin spillway 7 and also a coarse purification of the water flowing into the basin spillway 7 or the water flowing out of the basin spillway 7 to the drain 4, according to the prior art, for example (not shown in FIG. 1), rakes or screen devices are attached in the upper region of the weir threshold 6, which are used for pollutant retention.

Reference number 1 in FIG. 2 denotes a rain overflow basin according to the present invention. A preferably elongated, rigid, movement-fixed, and at least partially water-permeable retention element 11 is arranged inside the basin chamber 5. The retention element 11 has regions having a perforation 12, which can be embodied as round, polygonal, or slotted, so that a grating, screen, and/or net structure results. The perforation is preferably in the range of 4-10 mm×4-10 mm. The surface regions equipped with a perforation 12 thus cause a purification of the water flowing through the perforation 12. The overall size of the surface of the retention element 11 equipped with a perforation 12 accordingly has an effect on its purification function.

The flow direction of the water from the inflow 2 occurs, in comparison to the rain overflow basin 1 from FIG. 1, directly from the inflow 2 toward the basin chamber 5. Furthermore, in the event of rising water level, the water flows from the basin chamber 5 through the retention element 11 into a storage space 10 and subsequently into the basin spillway 7. The storage space 10 is separated from the basin spillway 7 by the weir threshold 6. According to the present invention, the water, which flows from the inflow 2 through the basin chamber 5 toward the basin spillway 7, accordingly flows through the retention element 11. Pollutants which are located in the water are held back in this case on the surface of the retention element 11, whereby an effective purification of the water flowing to the basin spillway 7 is achieved. Remaining water can also advantageously be pumped via a pump (not shown in the figures) out of the basin chamber 5 again if needed and supplied to the sewer system.

An emergency spillway 15 can advantageously be provided if needed in the region of the retention wall 8, which is used for the discharge of the basin chamber 5. For the case in which the rain overflow basin 1 is utilized to capacity or there is a clog in the region of the retention element 11, the water can flow unpurified via the emergency spillway from the basin chamber 5 toward the basin spillway 7. The emergency spillway 15 is preferably arranged in this case above the dimension boundary of the rain overflow basin 1.

FIGS. 3a-3f describe a method for the renovation of a conventional rain overflow basin 36 according to FIG. 1 into a rain overflow basin 1 according to the invention. FIG. 3a shows a first renovation step of the rain overflow basin 1. In this case, firstly a passage or a continuous recess 32 is provided inside the threshold 31, which separates the partition structure 30 and the basin chamber 5 from one another. The recess 32 can extend in this case over the entire length of the threshold 31 or only over a certain region of the threshold 31. In this way, a hydraulic coupling of the partition structure 30 and the basin chamber 5 results. Only a partial section remains of the threshold 31, which can also be entirely removed depending on the embodiment of the rain overflow basin 1.

Figure 3B:
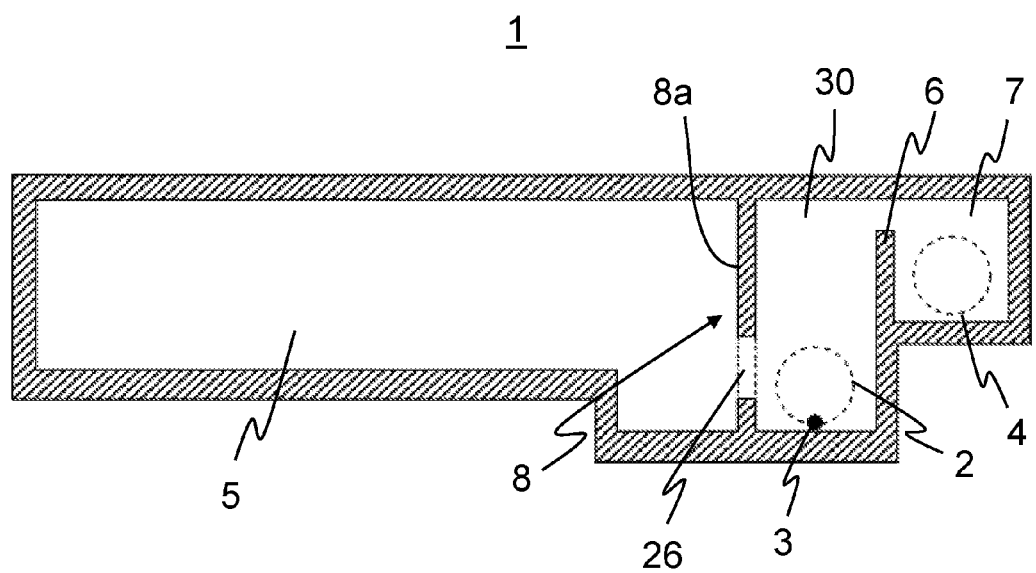
FIG. 3b shows a simplified sectional illustration of the rain overflow basin from FIG. 3a after completed further renovation measures.
Figure 3C:
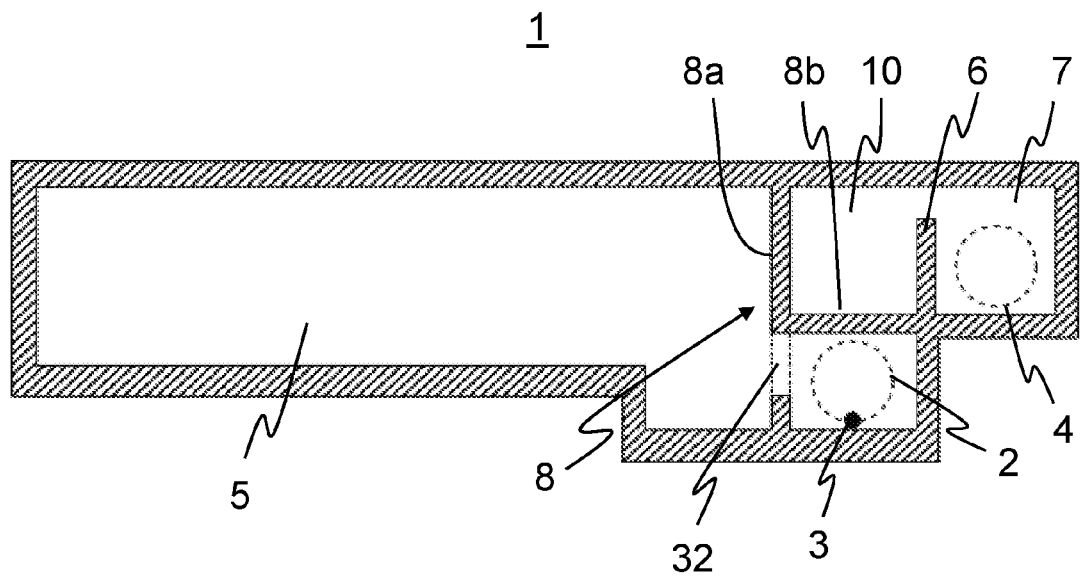
FIG. 3c shows a simplified sectional illustration of the rain overflow basin from FIG. 3b after completed further renovation measures.

According to FIG. 3b, in a further renovation section, the upwardly extending remaining partial section of the threshold 31 is extended upward to the ceiling of the rain overflow basin 1, so that a first wall section 8a, which extends essentially perpendicularly and is closed on top, of a retention wall 8 results. Subsequently, in a further work step according to FIG. 3c, a second partition section or wall section 8b of the retention wall 8 is incorporated in the region of the partition structure 30 above the inflow 2, which is oriented from the wall section 8a toward the basin spillway 7 and can extend essentially horizontally, for example. The wall sections 8a and 8b of the retention wall 8 extend in this case at an angle to one another. A storage space 10, which is separated from the basin chamber 5 by the wall section 8a and from the inflow 2 by the wall section 8b, is formed by the angled retention wall 8. Furthermore, the storage space 10 is separated from the basin spillway 7 by the weir threshold 6.

Figure 3D:
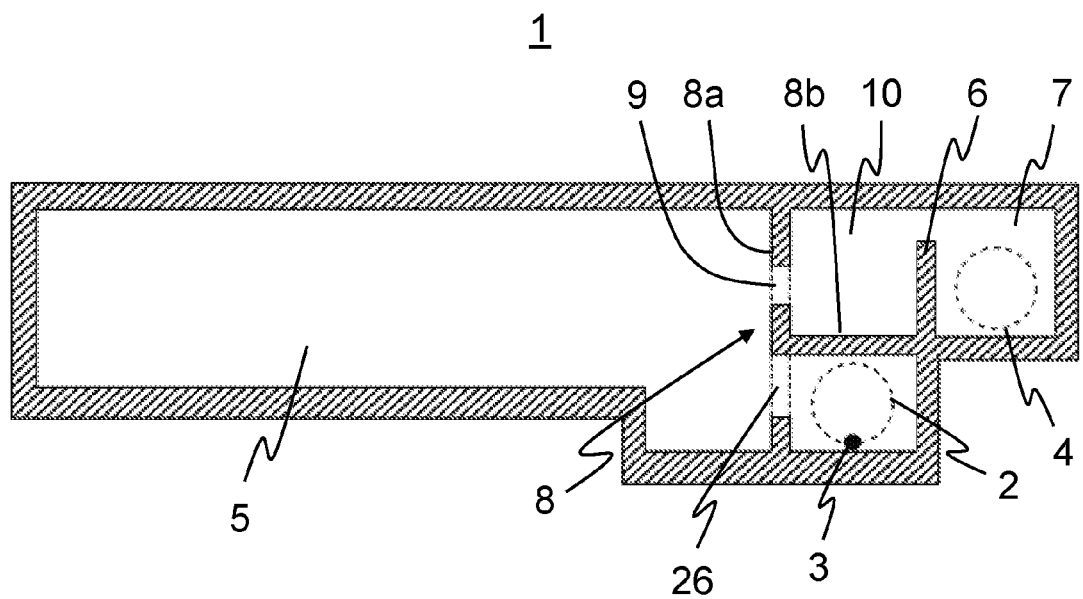
FIG. 3d shows a simplified sectional illustration of the rain overflow basin from FIG. 3c after completed further renovation measures.
Figure 3E:
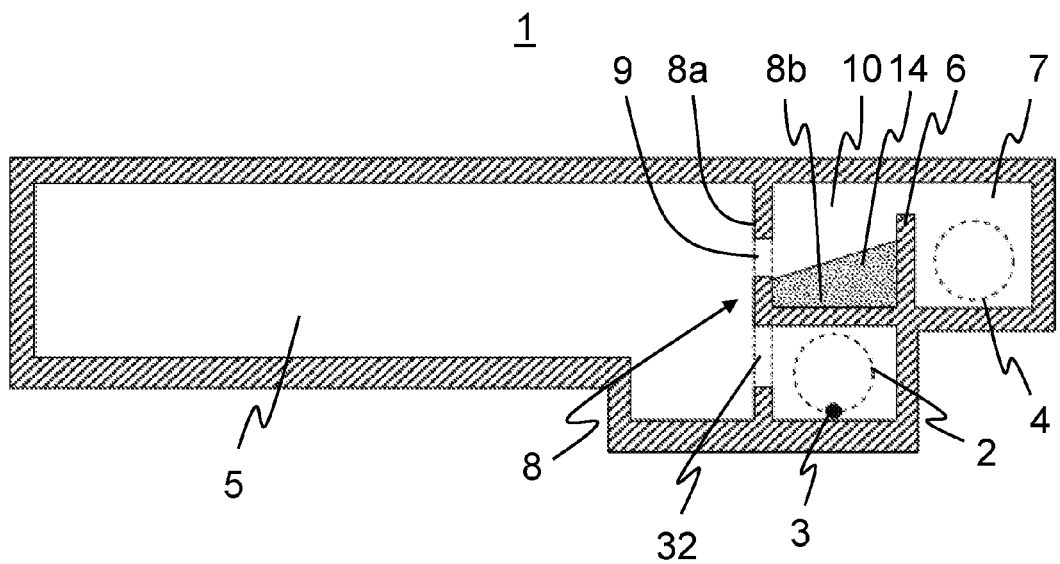
FIG. 3e shows a simplified sectional illustration of the rain overflow basin from FIG. 3d after completed further renovation measures.

In a further renovation step, according to FIG. 3d, a passage opening 9 is introduced into the retention wall, i.e., preferably into the wall section 8a, whereby a direct vent for water from the basin chamber 5 to the storage space 10 results. Furthermore, according to FIG. 3e, the storage space 10 can be equipped with a gradient 14, which drops from the weir threshold 6 toward the passage opening 9 of the retention wall 8 or the wall section 8a. The gradient 14 can be provided, for example, by means of an inlay or a casting compound, for example, screed or concrete, or can be an integral component of the wall section 8b. The gradient 14 prevents sedimentation procedures from taking place in the region of the storage space 10. It causes accumulating water in the region of the storage space 10 to flow back to the basin chamber 5 or the retention elements 11 again as soon as the water level in the storage space 10 or in the basin chamber 5 sinks. Pollutants in the region of the storage space 10 are flushed along the gradient 14 back into the basin chamber 5 by the reverse flow of the water.

Figure 3F:
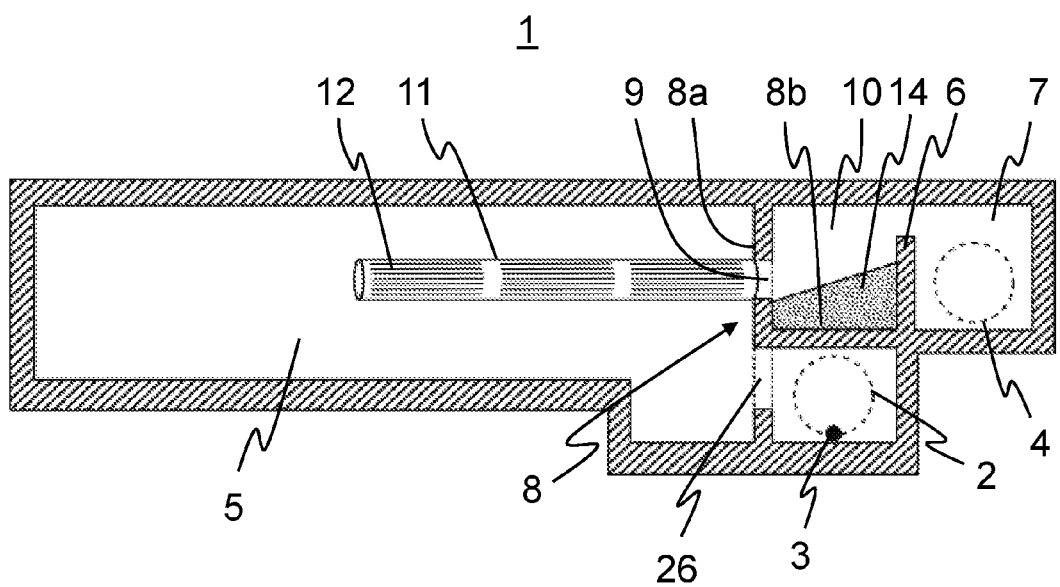
FIG. 3f shows a simplified sectional illustration of a second embodiment of the rain overflow basin according to the invention.

According to FIG. 3f, the retention element 11 is attached with a frontal opening in the region of the passage opening 9. The end face of the retention element 11 opposite to the passage opening 9 is preferably closed. The retention element 11 can be attached by means of fasteners to the retention wall 8. The retention element 11 can also be located at least partially inside the passage opening 9. Moreover, fastening devices (not shown) can be provided, which fix the retention element 11 on the ceiling, on the walls, and/or on the floor of the rain overflow structure 1.

FIG. 4 shows an alternative embodiment of a rain overflow basin 36 according to the prior art in the main connection. The basin chamber 5 is filled with water directly from the inflow 2 in this case. For the case in which the basin chamber 5 is filled with water up to the upper or overflow edge of the weir threshold 6, the water passes over the weir threshold 6 into the basin spillway 7, which is subsequently discharged via the drain 4.

FIGS. 5a-5d describe a method for the renovation of the rain overflow basin 1 from FIG. 4 into a rain overflow basin 1 according to the present invention. In this case, according to FIG. 5a, a pipe 33 is laid in the basin chamber 5, to connect the inflow 2 and the outflow 3. The pipe 33 consists, for example, of FRP, PVC, PE, or the like and can be arranged on a bulk material 34, for example. Moreover, the pipe 33 has a branch 33a, which is used as a connection to the basin chamber 5. A pipe opening 33b oriented toward the basin chamber 5 is located on the branch 33a, through which the water passes from the inflow 2 through the pipe 33 directly into the basin chamber 5.

Figure 5B:
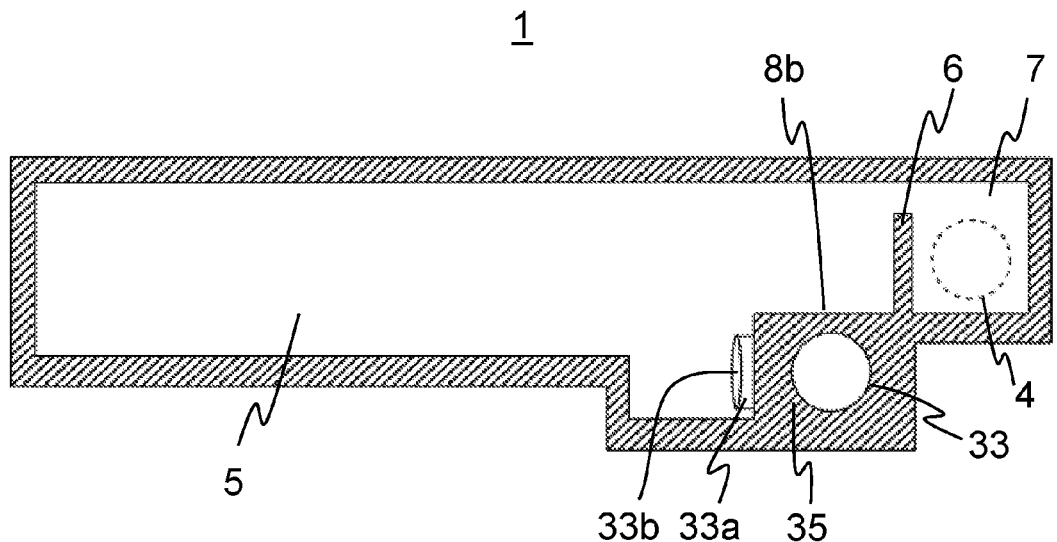
FIG. 5b shows a simplified sectional illustration of the rain overflow basin from FIG. 6a after completed further renovation measures.
Figure 5C:
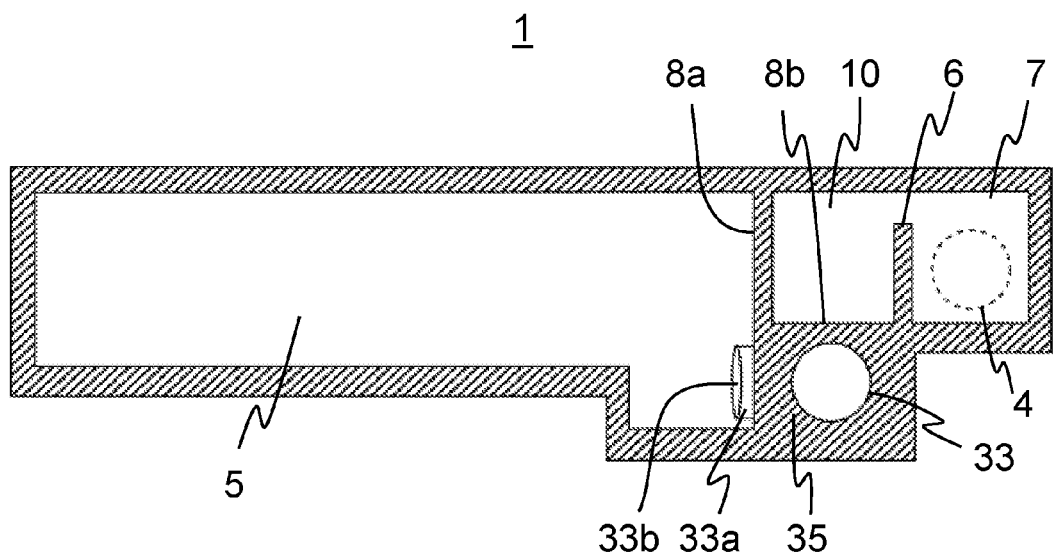
FIG. 5c shows a simplified sectional illustration of the rain overflow basin from FIG. 6b after completed further renovation measures.
Figure 5D:
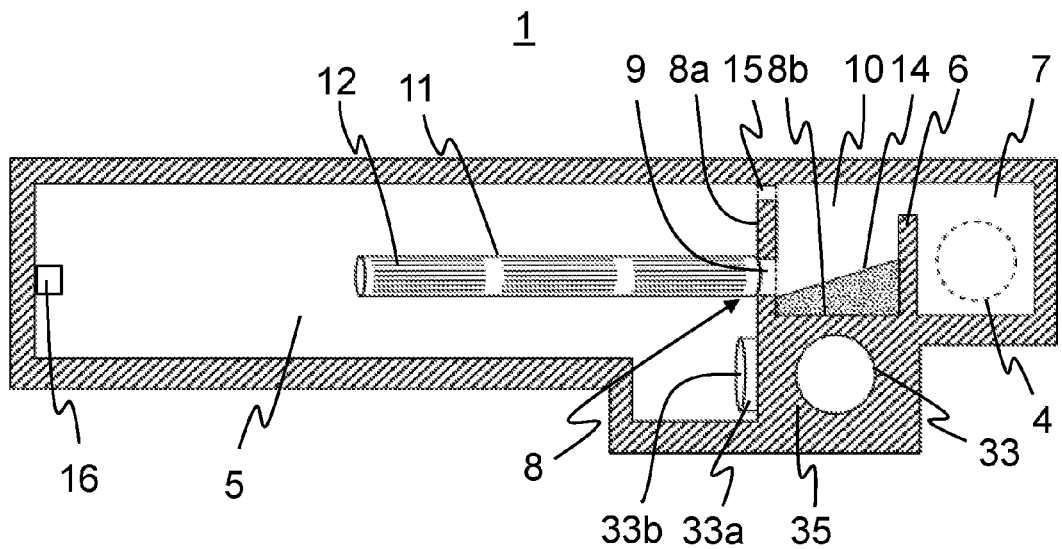
FIG. 5d shows a simplified sectional illustration of a third embodiment of the rain overflow basin according to the invention.

In a further work step according to FIG. 5b, the pipe 33 is embedded using a casting compound 35, for example, screed or concrete, so that an essentially horizontally extending surface or a wall results on the upper region of the casting compound 35, which forms the wall section 8b. In a further work step, a wall section 8a oriented upward from the wall section 8b is prepared, whereby a retention wall 8 results and the storage space 10 is established. Subsequently thereto, the retention wall 8 is provided, for example, in the region of the wall section 8a with a passage opening 9. A retention element 11, which is attached, for example, to the wall section 8a, is subsequently connected upstream of the passage opening 9. The retention element 11 corresponds to the retention element 11 of the first embodiment of the invention. Moreover, the storage space 10 can also be provided with a gradient 14, to avoid pollutants in the region of the storage space 10. Practically, the gradient 14 can also alternatively be manufactured as an integral component of the casting compound 35 and/or the wall section 8b in the work step of embedding the pipe 33. Furthermore, an emergency spillway 15 can be installed in the wall section 8a.

Alternatively or additionally, a sensor system can be provided, which can indicate a soiling of the retention element 11. For this purpose, for example, pressure load cells and/or water level meters 16 can be arranged in the region of the basin chamber 5, the storage space 10, and/or the basin spillway 7. For example, a water level meter 16 in the region of the basin chamber 5 and a water level meter (not shown for the sake of comprehensibility) in the region of the storage space 10 can respectively indicate the water level in the basin chamber 5 and in the storage space 10. A certain water level difference indicates a reduced water flow rate between basin chamber 5 and storage space 10 via the retention elements 11 in this case, wherein soiling of the retention element 11 can be concluded. As a result, a warning signal can be output, for example, at a central control center. The transmission of the warning signal can take place in practice via radio, a data line, or the like.

Figure 6:
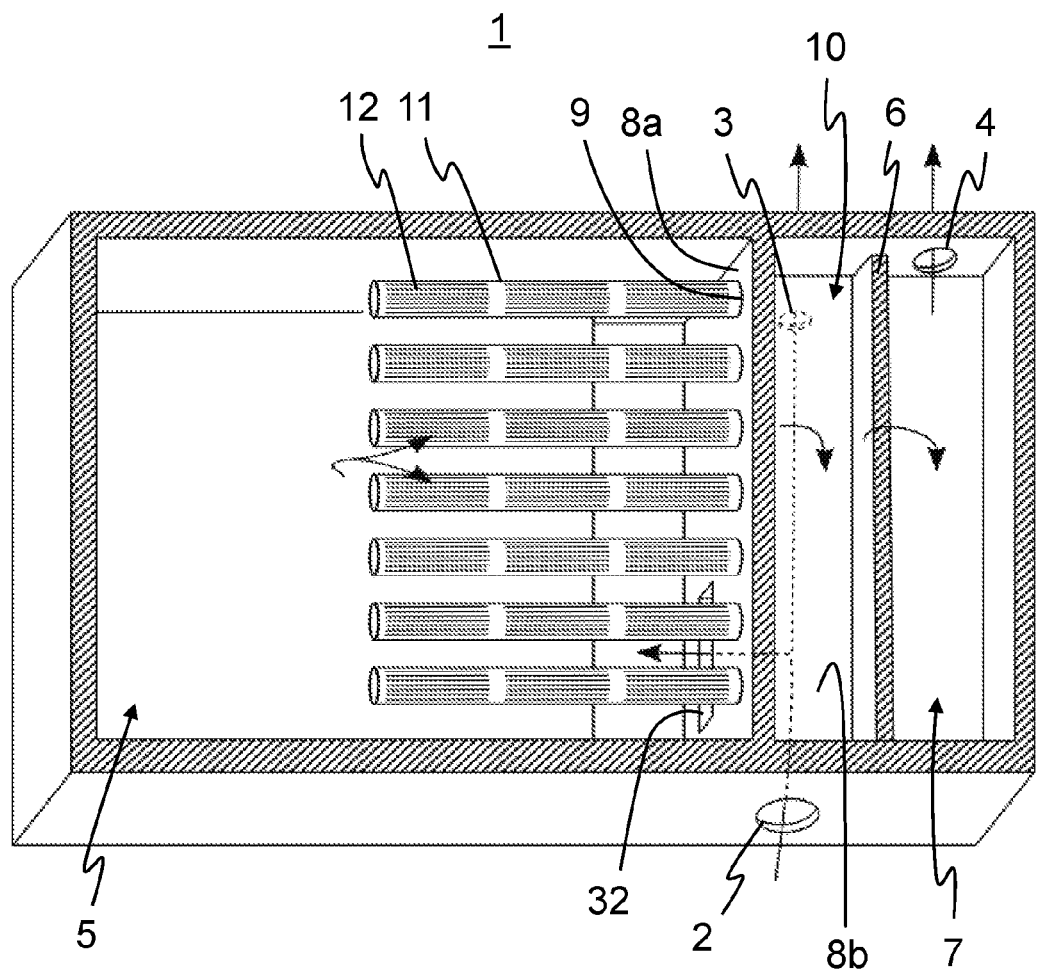
FIG. 6 shows a simplified perspective top view of the rain overflow basin from FIG. 3f.

FIG. 6 shows a perspective top view of the rain overflow basin 1 according to the invention having a battery system made of multiple retention elements 11, which are each arranged on a passage opening 9 inside the wall section 8a. Due to the arrangement of multiple retention elements 11, the purification effect can be substantially increased in comparison to conventional constructions, by providing the largest possible total surface, which causes the purification effect, in the region of the basin chamber 5. Additional mechanical components, for example, rakes or screens along the weir threshold 6, which cause continuous purification, can thus be omitted.

The flow direction of the water is shown in FIG. 6 with black, partially dashed, arrows. The flow direction of the water generally occurs from the inflow 2 to the outflow 3. In the case of a sudden accumulation of water because of heavy rain, the water additionally flows from the inflow 2 through the passage openings or recess 32 into the basin chamber 5, whereby the basin chamber 5 is filled with water. As soon the basin chamber 5 is filled with water up to the height of the retention elements 11, the water flows through the water-permeable regions, which are provided with a perforation 12, of the retention elements 11 into the storage space 10. In this case, pollutants are held back on the surface of the retention elements 11, while the purified water passes through the passage openings 9 into the storage space 10 and is dammed up in the storage space 10. After the filling of the storage space 10, the water passes over the weir threshold 6 and passes into the basin spillway 7. From the basin spillway 7, the water can drain off via the drain 4, for example, into a discharge channel, a body of water, or the like. The storage space 10 is preferably equipped with a gradient 14, which is not shown in FIG. 6 for the sake of comprehensibility.

Figure 7:
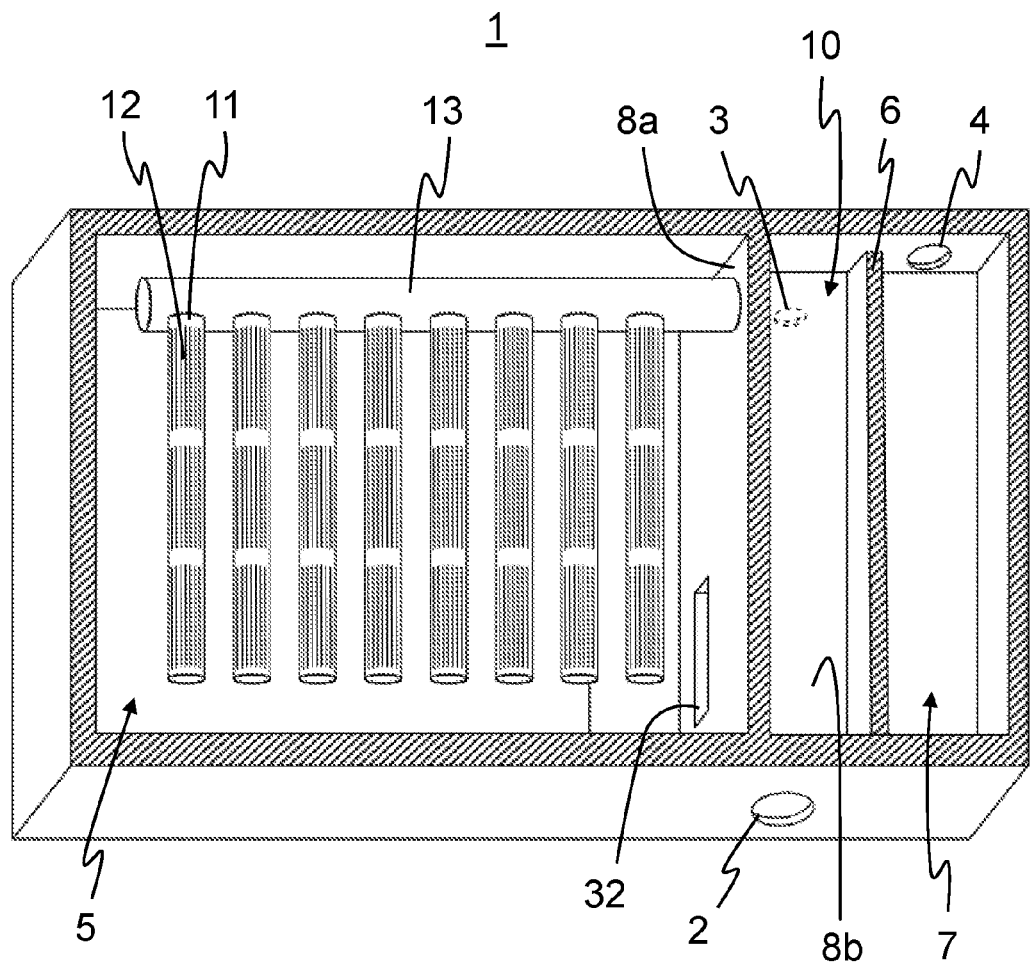
FIG. 7 shows a simplified perspective top view of a fourth embodiment of the rain overflow basin according to the invention.

An alternative embodiment of the rain overflow basin 1 is shown in FIG. 7. The retention elements 11 are arranged in this case on a tubular inflow element 13, which extends from the wall section 8a into the basin chamber 5. By way of the embodiment of the rain overflow basin 1 according to FIG. 7, it is possible, depending on the geometry of the basin chamber 5, to provide an even larger space of the basin chamber 5 for the arrangement of retention elements 11.

Figure 8:
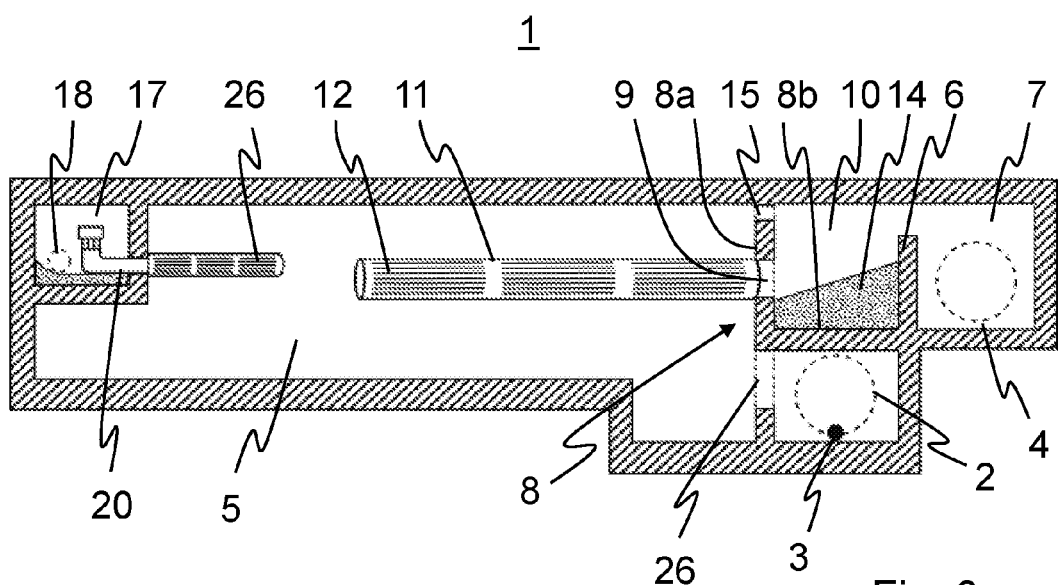
FIG. 8 shows a simplified sectional illustration of the rain overflow basin from FIG. 2 having a clear water spillway according to the invention.

FIG. 8 shows an alternative embodiment of the rain overflow basin 1 according to the invention having a clear water spillway 17. The clear water spillway 17 is located in the region of the basin chamber 5. A retention element 26 is connected upstream from the clear water spillway 17 and a drain 18, which discharges the clear water spillway 17, is connected downstream. The clear water spillway is used to ensure a first discharge of the basin chamber 5 (for example, the first 25% of the discharge).

A clear water spillway 17 on a basin chamber 5 having a drain 8 is shown in FIG. 9a. The clear water spillway 17 is connected in this case to the basin chamber 5 via an outlet or slot 28. The slot 28 is oriented diagonally upward toward the clear water spillway 17, whereby the maximum water level location of the clear water spillway Wsp KÜ is established at the edge of the slot 28 toward the clear water spillway 17. From the water level location Wsp KÜ, the water flows via the slot 28 into the clear water spillway 17. The discharge of the basin chamber 5 occurs from the water level location Wsp KÜ via the clear water spillway 17 and the drain 18. Upon reaching the water level location of the basin spillway Wsp BÜ, i.e., with the overflow of the weir threshold 6 (cf., for example, FIG. 2), a discharge of the basin chamber 5 takes place via the basin spillway 7 or the drain 4, the clear water spillway 17, or the drain 18. The water of the clear water spillway 17 is purified in this case, for example, via sedimentation procedures in the region of the basin chamber 5, before it enters the clear water spillway 17. This purification effect is not sufficient in particular during heavy rain events having a high level of water accumulation.

FIG. 9b shows an embodiment of a clear water spillway 17 according to the invention. In this case, the clear water spillway 17 is connected to the basin chamber 5 via an inflow device 20, which is partially arranged in the region of an opening 19 in the wall of the clear water spillway 17. The inflow device 20 has an inlet 21 and an exit 22. The flow direction of the water occurs from the basin chamber 5 via the inlet 21 through the inflow device 20 toward the exit 22, which is located inside the clear water spillway 17. A retention element 26 equipped with a perforation 27 is connected upstream of the inlet 21 in this case. The water which flows from the basin chamber 5 toward the clear water spillway 17 is thus purified before the entry into the inflow device 20. The inflow device 20 is embodied as a pipe elbow having applied clarification slots or openings 23 and has an angled section 20a, which is located in the interior of the clear water spillway 17. The pipe elbow can be manufactured in this case, for example, from FRP, PVC, or PE pipe. According to FIG. 9b, the pipe elbow has the exit 22, which is formed by the multiple openings 23, at the upper end of the angled section 20a. The openings 23 are in turn located between webs 24 of the pipe elbow. The lower region of the exit openings 23 forms the water level location of the clear water spillway Wsp KÜ. Upon rising over the water level location of the clear water spillway Wsp KÜ, the clear water spillway 17 thus starts. The upper region of the outlet opening 23 is at the level of the water level location of the basin spillway Wsp BÜ, i.e., the water level location from which the basin spillway 17 starts. Above the water level location Wsp BÜ, the pipe elbow can extend closed on top or, according to FIG. 9b, can have a cap 25, which terminates the pipe elbow on top. The cap 25 is preferably arranged in this case in the region of the maximum water level location of the rain overflow basin Wsp max.

LIST OF REFERENCE NUMERALS 1 rain overflow basin
2 inflow
3 outflow
4 drain
5 basin chamber
6 weir threshold
6 basin spillway
7 retention wall
8a wall section
8b wall section
9 passage opening
10 storage space
11 retention element
12 perforation
13 inflow element
14 gradient
15 emergency spillway
16 water level meter
17 clear water spillway
18 drain
19 opening
20 inflow device
20a angled section
21 entry
22 exit
23 exit opening
24 web
25 cap
26 retention element
27 perforation
28 slot
30 partition structure
31 threshold
32 recess
33 pipe
33a branch
33b pipe opening
34 bulk material
35 casting compound
36 rain overflow basin according to the prior art
Wsp KÜ maximum water level clear water spillway
Wsp BÜ maximum water level basin spillway
Wsp max maximum water level

The invention claimed is:
1. A rain overflow basin for collecting and storing water; comprising:
an inflow;
an outflow; wherein water flows from the inflow toward the outflow;
a basin chamber separated from the inflow and the outflow by a wall section, the wall section having a through hole fluidly connecting the inflow to the basin chamber;
a storage space downstream of the basin chamber and separated from the basin chamber by a retention wall, the storage space being between the retention wall and a weir threshold; the retention wall defining a passage opening into the storage space; wherein the retention wall dams up water accumulating in the basin chamber and water draining from the basin chamber is dammed up in the storage space, to pass over the weir threshold into a basin spillway downstream of the storage space and the basin chamber;
a drain in fluid communication with the basin spillway and which discharges the basin spillway; and
a movement-fixed retention element comprising a purification device, the purification device purifying the water flowing from the basin chamber to the basin spillway; the purification device extending into the basin chamber such that water draining from the basin chamber through the passage opening into the storage space flows through the retention element;

wherein the weir threshold creates a gradient of the surface of the water in the storage space, the surface of the water drops from the weir threshold toward the passage opening of the retention wall; the gradient creating a reverse flow of water from the storage space toward the basin chamber with dropping water level in the rain overflow basin.

2. The rain overflow basin as claimed in claim 1, wherein the retention wall has an upwardly extending first wall section and a second wall section, which is oriented substantially horizontally and extends toward the basin spillway.

3. The rain overflow basin as claimed in claim 1, wherein comprising a tubular element extending into the basin chamber from the passage opening and connects to the purification device.

4. The rain overflow basin as claimed in claim 1, wherein the retention element at least regionally has a round, polygonal, and/or slotted perforation.

5. The rain overflow basin as claimed in claim 1, wherein an emergency spillway is provided in the retention wall between the basin chamber and the basin spillway, and wherein the emergency spillway is above the passage opening.

6. The rain overflow basin as claimed in claim 1, wherein a sensor device is provided, and a degree of soiling of the retention elements is derived from measured data of the sensor device.

7. The rain overflow basin as claimed in claim 1, wherein multiple retention elements are provided and arranged in parallel to one another.

8. A rain overflow basin for collecting and storing water, comprising:
an inflow;
an outflow; wherein water flows from the inflow toward the outflow;
a basin chamber; separated from the inflow and the outflow by a wall section, the wall section having a through hole fluidly connecting the inflow to the basin chamber;
a basin spillway, which is equipped with a weir threshold, and is connected downstream of the basin chamber;
a first drain in fluid communication with the basin spillway and which discharges the basin spillway;
a clear water spillway having a second drain, which is connected downstream of the basin chamber and separately from the basin spillway, the clear water spillway including an opening to the basin chamber;
a retention element is provided inside the basin chamber, which extends into the basin chamber; wherein water draining from the basin chamber through the opening into the clear water spillway flows through the retention element.

9. The rain overflow basin as claimed in claim 8, wherein an inflow device is provided in the region of the inflow from the basin chamber into the clear water spillway, wherein the inflow device has an entry and an exit, a flow direction of the water extends from the entry to the exit, the inflow device has an angled section, which is oriented essentially upward, and the exit is arranged below a water level location of the basin spillway on the angled section.

10. The rain overflow basin as claimed in claim 8, wherein the exit of the inflow device comprises multiple openings.

11. A method for renovating a rain overflow basin, the rain overflow basin comprising an inflow; an outflow, wherein water flows from the inflow toward the outflow; a basin chamber separated from the inflow and the outflow by a wall section, the wall section having a through hole fluidly connecting the inflow to the basin chamber; a basin spillway, which is connected downstream of the basin chamber; and a drain in fluid communication with the basin spillway, which discharges the basin spillway;

the method comprising the following steps:
providing a partition device in a region of the basin chamber, which forms a storage space, which is connected downstream of the basin chamber and upstream of the basin spillway;
providing a passage between the inflow and the basin chamber by at least partially opening the partition device or by introducing a connecting device between the inflow and the basin chamber;
creating at least one passage opening in the region of the partition device, which is used for water to pass from the basin chamber to the storage space; and
installing at least one retention element, which extends into the basin chamber, in a region of a passage opening, or installing an inflow element, which extends into the basin chamber, in a region of the passage opening, wherein a plurality of retention elements extend into the basin chamber from the inflow element;
providing a weir threshold between the storage space and the basin spillway to create a gradient of water inside the storage space, which drops from the weir threshold toward the partition device, the gradient creating a reverse flow of water from the storage space toward the basin chamber with dropping water level in the rain overflow basin.

12. The method as claimed in claim 11, wherein the method comprises a step of preparing an emergency spillway in the partition device between the basin chamber and the storage space and wherein the emergency spillway is above the passage opening.

13. The method as claimed in claim 11, wherein the method comprises a step of preparing a clear water spillway having an inflow device separate from the basin spillway.

* * * * *